(12) United States Patent
Choi et al.

(10) Patent No.: US 12,202,731 B2
(45) Date of Patent: Jan. 21, 2025

(54) METHOD FOR PREPARING SILICON COMPOSITE

(71) Applicant: KOREA METAL SILICON CO., LTD., Gangwon-do (KR)

(72) Inventors: Jong Oh Choi, Gangwon-do (KR); Min Sun Kim, Gangwon-do (KR); Jong Sik Yoo, Seoul (KR)

(73) Assignee: KOREA METAL SILICON CO., LTD., Gangwon-do (KR)

( * ) Notice: Subject to any disclaimer, the term of this patent is extended or adjusted under 35 U.S.C. 154(b) by 421 days.

(21) Appl. No.: 17/433,547

(22) PCT Filed: Oct. 22, 2020

(86) PCT No.: PCT/KR2020/014453
§ 371 (c)(1),
(2) Date: Aug. 24, 2021

(87) PCT Pub. No.: WO2021/091127
PCT Pub. Date: May 14, 2021

(65) Prior Publication Data
US 2022/0259050 A1 Aug. 18, 2022

(30) Foreign Application Priority Data
Nov. 4, 2019 (KR) ........................ 10-2019-0139739

(51) Int. Cl.
*C01B 33/02* (2006.01)
*C01B 32/05* (2017.01)
*C01B 32/21* (2017.01)

(52) U.S. Cl.
CPC .............. *C01B 33/02* (2013.01); *C01B 32/05* (2017.08); *C01B 32/21* (2017.08); *C01P 2004/80* (2013.01); *C01P 2006/40* (2013.01)

(58) Field of Classification Search
None
See application file for complete search history.

(56) References Cited

FOREIGN PATENT DOCUMENTS

| CN | 105390698 | * | 3/2016 | | |
|---|---|---|---|---|---|
| CN | 105720258 | * | 6/2016 | | |
| CN | 107799732 A | | 3/2018 | | |
| CN | 109690838 A | | 3/2018 | | |
| CN | 108807861 | * | 11/2018 | | |
| CN | 110299519 | * | 10/2019 | | |
| EP | 0637510 | * | 5/1994 | | |
| EP | 637510 A1 | * | 2/1995 | ........... | B29C 70/083 |
| KR | 10-2013-0004536 A | | 1/2013 | | |
| KR | 10-2015-0072319 A | | 6/2015 | | |
| KR | 10-2018-0027022 A | | 9/2016 | | |
| KR | 20180108707 | * | 10/2018 | | |
| KR | 10-2019-0046968 A | | 5/2019 | | |
| KR | 10-2019-0093177 A | | 8/2019 | | |
| KR | 20190117633 | * | 10/2019 | | |
| KR | 10-2085938 B1 | | 3/2020 | | |
| WO | 2018046768 | * | 3/2018 | | |
| WO | 2021/091127 A1 | | 5/2021 | | |

OTHER PUBLICATIONS

Richardson, J.F. et al. "Chemical Engineering" 5th Ed. vol. 2: Particle Technology and Separation Processes. Chemical Engineering Series. Chapter 2: Particle Size Reduction and Enlargement. vol. 2, p. 95-145 (2002). (Year: 2002).*
Office Action for Chinese Patent Application No. 202080017244.4 mailed Dec. 25, 2023 (with English translation), 12 pages.
International Search Report and Written Opinion for PCT/KR2020/014453 dated Jan. 27, 2021, all pages.
Office Action for Korean ApplN No. 10-2019-0139739 dated Dec. 18, 2019, all pages.
Office Action for Korean ApplN No. 10-2019-0139739 dated Feb. 24, 2020, all pages.

* cited by examiner

*Primary Examiner* — Sheng H Davis
(74) *Attorney, Agent, or Firm* — Kilpatrick Townsend & Stockton LLP

(57) ABSTRACT

Provided is a method of preparing a silicon composite. The method of preparing a silicon composite includes forming a silicon solution by wet-grinding a silicon raw material; forming silicon fine powder by spray-drying the silicon solution; disintegrating the silicon fine powder; forming a dispersion by coating the silicon fine powder with a first pitch; forming a first composite by coating the dispersion with a second pitch; forming a second composite by carbonizing the first composite; and classifying the second composite according to a preset particle size reference.

10 Claims, 10 Drawing Sheets

METHOD FOR PREPARING SILICON COMPOSITE

TECHNICAL FIELD

The present disclosure relates to a method of preparing a silicon composite.

BACKGROUND ART

Recently, with the development of information communication technology according to the 4th industrial revolution, an energy storage system (ESS) is attracting the attention for the construction of energy infrastructure. The energy storage system is a component forming energy infrastructure and an important element for realizing the next-generation energy network. A secondary battery is evaluated as a core technology for realizing such an energy storage system.

Graphite, a carbon-based material, has been mainly used as a negative active material for a conventional lithium secondary battery, but the limitation of a low lithium storage capacity (the theoretical capacity of about 370 mAh/g) is problematic. Accordingly, in order to increase the capacity of a lithium secondary battery, research on a silicon material, which is one of non-carbon based negative active materials, is being actively conducted.

Silicon has an excellent lithium storage capacity (theoretical capacity of about 4200 mAh/g), compared to carbon, and is evaluated as a material that can contribute to increasing the capacity of lithium secondary batteries. However, as silicon has a lithium storage capacity per weight that is 10 times higher than that of conventional graphite, the silicon reacts with lithium during charging and discharging, thereby showing a large volume change (300% to 400%). Due to this, there is a problem in that the electrode of a lithium secondary battery is damaged or broken, so silicon has not been commercialized yet.

The above-described background technology is technology information that the inventor possessed for the derivation of the present disclosure or acquired in the process of the derivation of the present disclosure, and may not be considered as a known technology disclosed to the general public prior to the filing of the present disclosure.

DESCRIPTION OF EMBODIMENTS

Technical Problem

Provided is a method of preparing a silicon composite, which may reduce the volume change of a silicon material and implement a high-capacity secondary battery. However, such an objective is exemplary, and the scope of the present disclosure is not limited thereby.

Solution to Problem

According to an aspect of the present disclosure, a method of preparing a silicon composite includes forming a silicon solution by wet-grinding a silicon raw material, forming silicon fine powder by spray-drying the silicon solution, disintegrating the silicon powder, forming a dispersion by coating the silicon fine powder with a first pitch, forming a first composite by coating the dispersion with a second pitch, forming a second composite by carbonizing the first composite, and classifying the second composite according to a preset particle size reference.

In an embodiment, in the forming of the silicon solution, balls and a solvent may be added to the silicon raw material and wet-ground, and a ratio of the silicon raw material and the solvent is 1:4 to 1:6 in weight percentage, and wet-grinding may be performed at a grinding speed of 1900 rpm to 3200 rpm for 1.5 hours to 8.5 hours.

In an embodiment, in the forming of the silicon solution, the wet-grinding is performed at a grinding speed of 1900 rpm to 2100 rpm for 1.5 hours to 4.5 hours.

In an embodiment, in the forming of the silicon fine powder, the silicon fine powder including particles having a spherical shape may be obtained by spraying the silicon solution and then applying hot wind, and the particle size of the silicon fine powder may be 100 nm to 400 nm.

In an embodiment, the forming of the dispersion may include forming a core by dispersing the silicon fine powder in graphite, and dry-coating the core with the first pitch.

In an embodiment, in the forming of the core, a content ratio of the silicon fine powder and the graphite may be 26:29 to 35:23 in weight percent.

In an embodiment, in the dry-coating of the core with the first pitch, the core may be dry-coated with the first pitch at a temperature of 120° C. or more and 150° C., and a content of the first pitch in the dispersion may be 15% or more and 16% or less in weight percent.

In an embodiment, in the forming of the first composite, mechanical strength of the second pitch may be greater than mechanical strength of the first pitch.

In an embodiment, in the forming of the first composite, the dispersion may be dry-coated with the second pitch at a temperature of 240° C. or more and 270° C., and a content of the second pitch in the first composite may be 16% or more and 17% or less in weight percent.

In an embodiment, in the forming of the first composite, the sum of a content of the first pitch and a content of the second pitch may be 32% or more and 35% or less in weight percent.

In an embodiment, in the forming of the second composite, the first composite may undergo a heat treatment at a temperature of 800° C. to 1200° C. for 1 hour to 3 hours.

In an embodiment, at least any one of the disintegrating of the silicon fine powder, the forming of the dispersion, the forming of the first composite, or the forming of the second composite may be performed in an inert gas atmosphere.

Advantageous Effects of Disclosure

In the method of preparing a silicon composite according to an embodiment of the present disclosure, the life and capacity of a battery may be improved by reducing the volume change of a silicon material.

BEST MODE

Figure 1:
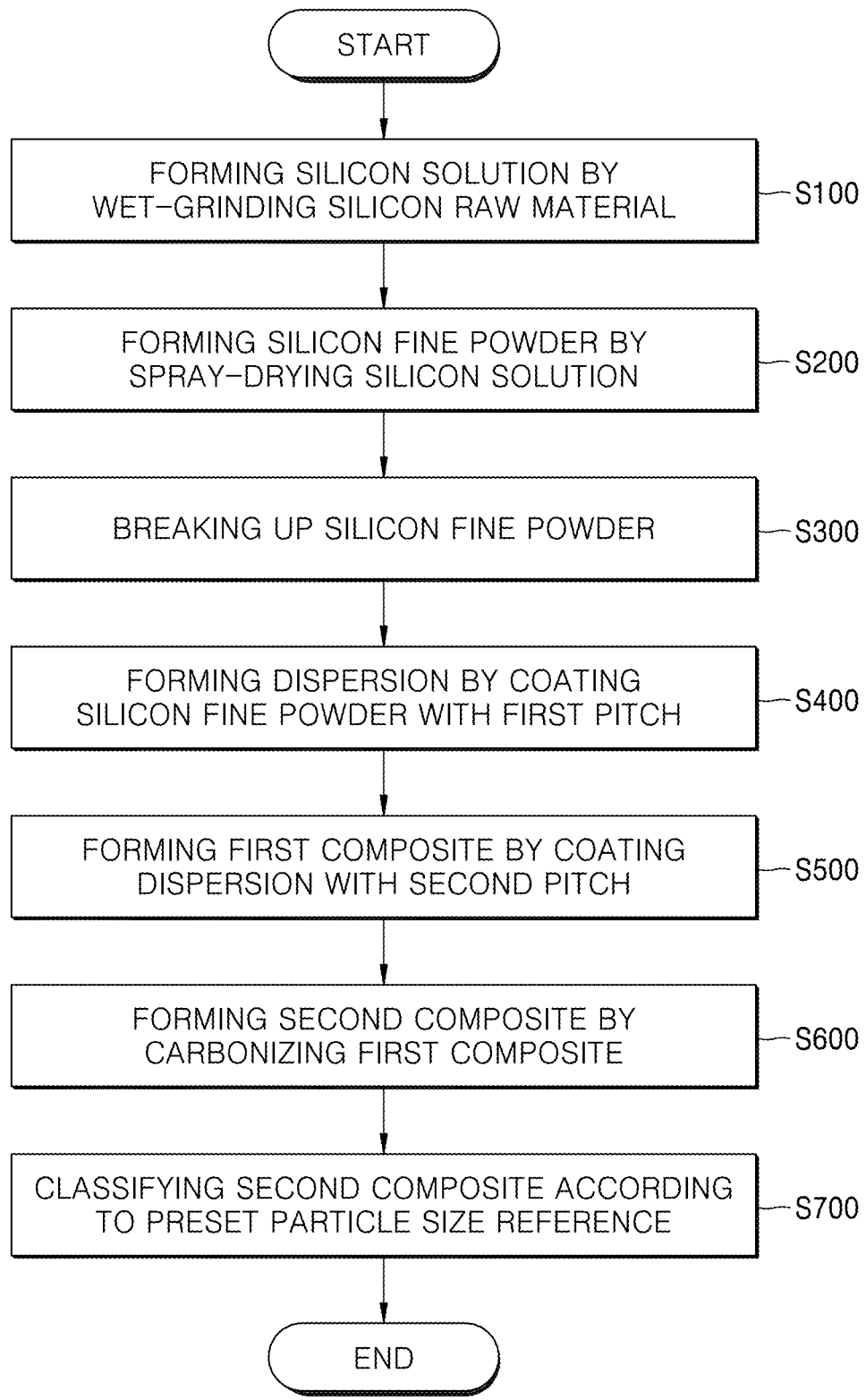
FIG. 1 is a view of a method of preparing a silicon composite, according to an embodiment of the present disclosure.

A method of preparing a silicon composite according to an embodiment of the present disclosure includes forming a silicon solution by wet-grinding a silicon raw material, forming silicon fine powder by spray-drying the silicon solution, disintegrating the silicon fine powder, forming a dispersion by coating the silicon fine powder with a first pitch, forming a first composite by coating the dispersion with a second pitch, forming a second composite by carbonizing the first composite, and classifying the second composite according to a preset particle size reference.

Mode of Disclosure

As the disclosure allows for various changes and numerous embodiments, embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. Even though it is shown in another embodiment in explaining the present disclosure, like reference numerals refer to like elements.

Terms such as "first" and "second" are used herein merely to describe a variety of constituent elements, but the constituent elements are not limited by the terms. Such terms are used only for the purpose of distinguishing one constituent element from another constituent element.

Terms used in the specification are used for explaining a specific embodiment, not for limiting the present disclosure. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Reference will now be made in detail to embodiments, examples of which are illustrated in the accompanying drawings. For reference, unless otherwise specified in the specification, % may mean weight percentage.

FIG. 1 is a view of a method of preparing a silicon composite, according to an embodiment of the present disclosure.

Referring to FIG. 1, a method of preparing a silicon composite according to an embodiment of the present disclosure may include forming a silicon solution by wet-grinding a silicon raw material (S100), forming silicon fine powder by spray-drying the silicon solution (S200), disintegrating the silicon fine powder (S300), forming a dispersion by coating the silicon fine powder with a first pitch (S400), forming a first composite by coating the dispersion with a second pitch (S500), forming a second composite by carbonizing the first composite (S600), and classifying the second composite according to a preset particle size reference (S700).

In the forming of a silicon solution (S100), a silicon solution is formed by performing wet-grinding on silicon powder obtained from metal silicon. The silicon powder may be obtained through the following silicon powder preparation operation.

First, metal silicon lumps are crushed, and crushed metal silicon particles are primarily ground. Next, metal impurities are removed from the primarily ground metal silicon particles. The metal impurities may be removed by using a magnetic beneficiation device and the like. Next, first silicon powder is obtained by secondarily grinding the silicon particles from which the metal impurities are removed. A particle of the secondarily ground silicon powder may have a diameter of about 45 μm to about 425 μm, and second silicon powder may be obtained by selecting silicon powder within 98% of a particle size distribution therefrom.

The obtained second silicon powder may be in a state of containing various foreign materials contained in the metal silicon lump. Accordingly, a process of removing foreign materials from the secondary silicon powder may be further performed. For example, the purity of second silicon powder may be increased though a process of removing iron (Fe) contained in second silicon powder. Next, a final silicon powder that becomes a raw material of a silicon composite may be obtained by collecting a silicon power having an average particle size of about 20 μm to about 30 μm, from the second silicon powder. The ingredient content of final silicon powder used in an embodiment of the present disclosure is shown in Table 1 below.

TABLE 1

| Ingredients | Content (wt %) |
| --- | --- |
| Silicon (Si) | 99.96 |
| Iron (Fe) | 0.0167 |
| Aluminum (Al) | 0.0006 |
| Calcium (Ca) | 0.02 |

As shown in Table 1, in an embodiment of the present disclosure, a silicon composite may be prepared by using high-purity silicon powder containing a silicon content of 99.9 wt % or more. However, the ingredient content of silicon powder in Table 1 is an embodiment, and the ingredient content may vary (the other contents may be inevitable impurities).

In the forming of a silicon solution (S100), balls and a solvent are added to and mixed with the silicon powder obtained as above, and then wet-grinding is performed thereon, thereby forming a silicon solution.

The material and amount of the ball are not particularly limited, and may vary depending on the size of a chamber or container in which the wet-grinding is performed. In an embodiment of the present disclosure, zirconia balls may be mixed by about 80% of the container volume. Furthermore, the diameter of a ball may be 0.3 mm.

The solvent may be used as an accelerant of a dispersion reaction during the wet-grinding, and in an embodiment of the present disclosure ethanol, an organic solvent such as isopropyl alcohol (IPA), methanol, and the like may be used. By adding an organic solvent to the silicon powder, compared to dry grinding, the particle size of the silicon powder may be efficiently controlled. Although the solvent is not particularly limited, water may not be used due to an adverse effect on the performance of a secondary battery. When water is used as a solvent, the degree of oxidation of silicon powder is increased, and as the water functions as an anode material of a lithium secondary battery, during a process of charging and discharging, lithium ions are combined with silicon and oxygen, thereby forming a compound such as $Li_2O$, $LiSiO_x$, and the like. Furthermore, as an irreversible reaction occurs due to the water, the performance of a secondary battery may be reduced.

In the forming of a silicon solution (S100), the silicon powder and the solvent may be mixed at a ratio of 1:4 or more and 1:6 or less. The ratio may be based on wt %. When the ratio of silicon powder and solvent is less than 1:4, a pump of a wet-grinding apparatus may have excessive pressure. Furthermore, the wet-grinding apparatus may be overloaded, and the pressure and temperature of a chamber or container used for wet-grinding may be increased. Accordingly, the silicon powder may be oxidized, and a target particle size of wet-grinding may not be reached. Reversely, when the ratio of silicon powder and solvent exceeds 1:6, the ratio of solvent is too high, and the pressure of a chamber or container used for wet-grinding decrease so that a circulation speed of silicon powder and solvent may be reduced. Accordingly, as the efficiency of wet-grinding is lowered, a silicon solution of a target particle size may be difficult to fabricate, and moreover, a process time increases so as to adversely affect a production efficiency.

The wet-grinding may be performed at a grinding speed of 1900 rpm or more and 3200 rpm or less. When a grinding speed is less than 1900 rpm, the particle sizes of 10% (D10) and 90% (D90) of a particle size distribution of the silicon powder increase too large to reach the target particle size. Reversely, when the grinding speed exceeds 3200 rpm, balls in a container where wet-grinding is performed may not contact the silicon powder to wander in vain along the inner wall of the container. Accordingly, the particle size of D10 is too small, or the particle size of D90 is too large enough to have a particle size (about 1 μm) similar to the silicon raw material. Furthermore, the temperature of the silicon powder exceeds 40° C., and thus, the wet-grinding apparatus may be unstable.

Particularly, the wet-grinding may be performed at a grinding speed of 1900 rpm or more and 2100 rpm or less. More particularly, the wet-grinding may be performed at a grinding speed of 1900 rpm or more and 2000 rpm or less. Within the above grinding speed range, the silicon powder may maintain a temperature of 37° C. or more and 38° C. or less, and the wet-grinding may be stably performed in the temperature range.

The wet-grinding may be performed for 1.5 hours or more and 8.5 hours or less. When the grinding time is less than 1.5 hours, the particle size of silicon powder may not reach the target particle size. Furthermore, when the grinding time exceeds 8.5 hours, the particle size of silicon powder may be less than the target particle size, or a particle size difference in the silicon powder hardly occurs so that a target particle size distribution may not be achieved. When a pole plate is manufactured by using a finally prepared silicon composite, to increase the density of the pole plate, a silicon composite may have various particle size distributions. Accordingly, the particle size difference in the silicon powder may be appropriately controlled. Furthermore, when the grinding time exceeds 8.5 hours, a process time may increase and productivity may be reduced.

Particularly, the wet-grinding may be performed for 1.5 hours or more and 4.5 hours or less. More particularly, the wet-grinding may be performed for 4 hours or more and 4.5 hours or less. As the silicon solution is formed through a wet-grinding process satisfying the conditions, a volume change of the silicon powder may be reduced.

Next, silicon fine powder is formed by spray-drying a silicon solution (S200). As the formed silicon solution includes a solvent, when a silicon composite is prepared by using the silicon solution without change, it may be difficult to control the silicon solution in the below-described dispersion forming operation (S400), first composite forming operation (S500), and second composite forming operation (S600). Accordingly, the solvent included in the silicon solution may be vaporized.

A method of drying a silicon solution is not particularly limited, and in an embodiment of the present disclosure, a spray-drying method may be used. For example, after particles are atomized by spraying the silicon solution into a spray-drying apparatus, the solvent may be vaporized by blowing hot wind into the spray-drying apparatus, thereby forming dried silicon fine powder. At this time, the temperature of an entrance of the spray-drying apparatus may be in a range of 100° C. or more and 250° C. or less.

Although the form of silicon fine powder formed through the spray-drying is not particularly limited, in an embodiment of the present disclosure, the silicon fine powder may have particles of a spherical shape. As the particles of the silicon fine powder are controlled to have a spherical shape by controlling the operating temperature, time, speed, and the like of the spray-drying apparatus, the pole plate density of a finally prepared secondary battery may be improved.

Figure 4:
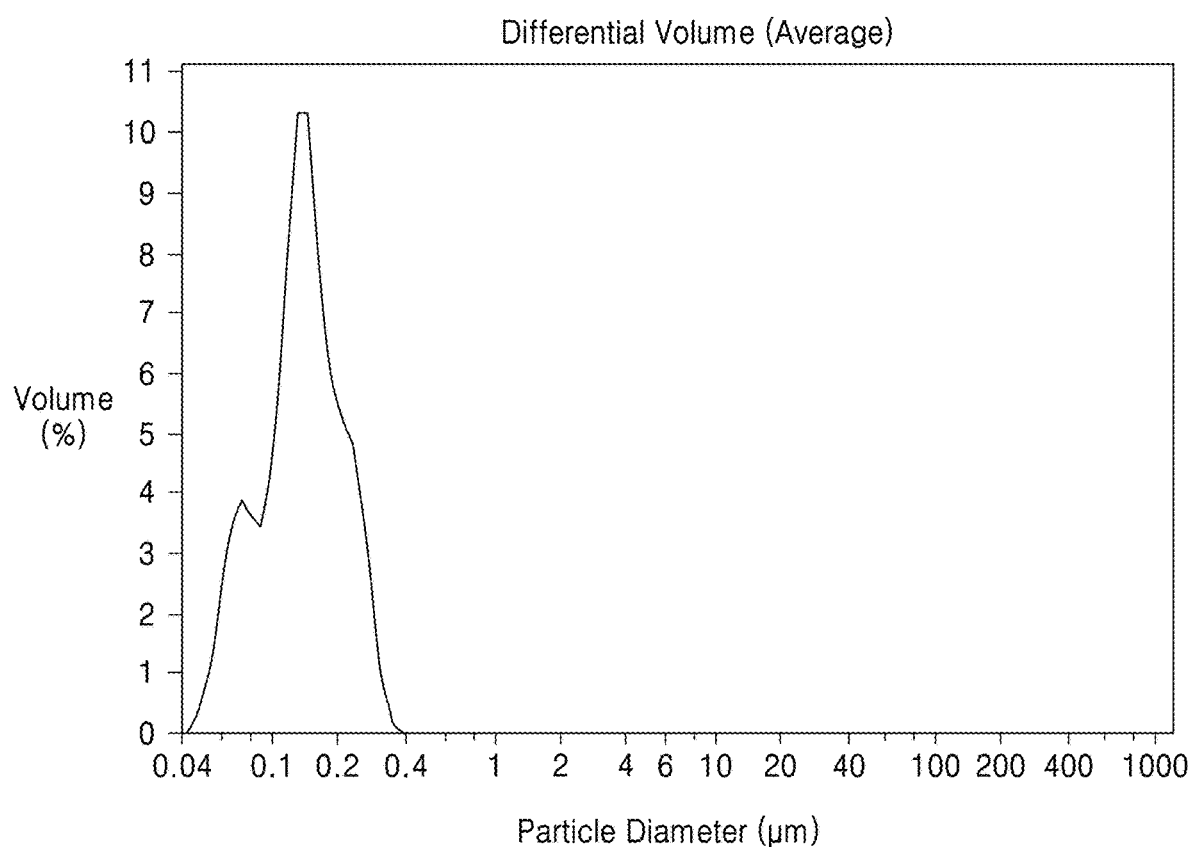
FIG. 4 is a view of a particle size distribution of silicon fine powder of FIG. 1.

FIG. 4 is a view of a particle size distribution of the silicon fine powder of FIG. 1.

As illustrated in FIG. 4, in a silicon composite prepared by the method of preparing a silicon composite according to an embodiment of the present disclosure, the particle size of silicon fine powder may be 100 nm or more and 400 nm or less. In detail, 10% (D10) of a particle size distribution may be 0.072 μm, 50% (D50) of the particle size distribution may be 0.136 μm, 90% (D90) of the particle size distribution may be 0.261 μm, and 100% (D100) of the particle size distribution may be 0.452 μm. By specifying the particle size of a silicon fine powder distribution as above, the efficiency characteristics, capacity characteristics, and stability of a secondary battery may be improved.

In the process of drying the silicon solution with hot wind, as particles of the silicon powder are cohesive to each other, the particles may have a size larger than the particles of the silicon powder having undergone the wet-grinding. Accordingly, after the forming of the silicon fine powder (S200), an operation of disintegrating the silicon fine powder may be further included.

The disintegrating of the silicon fine powder (S300) may be performed through a track motion for a short time, by inputting the dried silicon fine powder to an ultra-fine powder crusher. Through the disintegrating of the silicon fine powder, the target particle size of a silicon fine powder distribution may be more reliably achieved.

Next, a dispersion is formed by coating the silicon fine powder with a first pitch (S400). In order to use silicon fine powder as an anode material of a secondary battery, as described above, a silicon volume change is a problem. To address the silicon volume change problem, a composite structure of silicon fine powder and a carbon material may be formed. In detail, a dispersion is formed by mixing the silicon fine powder with a carbon material and a pitch. The carbon material and the pitch are not particularly limited, and in an embodiment of the present disclosure, graphite, in detail, artificial graphite, may be used as the carbon material, and a petroleum pitch, or the first pitch, may be used as the pitch.

First, a core is formed by uniformly dispersing the silicon fine powder on the graphite. In an embodiment of the present disclosure, the graphite in use may be particulate artificial graphite powder having a particle size of 3 μm to 5 μm. By using the artificial graphite, a secondary battery having a stable structure and extended life may be prepared.

In the forming of a core, artificial graphite may be mixed such that a content ratio of the silicon fine powder and the artificial graphite satisfies 26:29 to 35:23 in weight percent. When the content ratio of the silicon fine powder and the artificial graphite is less than 26:29, a silicon content having a relatively high lithium storage capacity is low, and thus, the capacity of a secondary battery is lowered. Furthermore, as the content of artificial graphite is low, the stability and output of a secondary battery may be adversely affected. Reversely, when the content ratio of the silicon fine powder and the artificial graphite exceeds 35:23, the silicon volume change increases, and thus, an electrode of a secondary battery may be damaged or broken, and also charging/discharging efficiency may be reduced.

Next, a dispersion is formed by coating the formed core with a first pitch. The first pitch may form a shell of the dispersion. In an embodiment of the present disclosure, the core may be dry-coated with the first pitch by using a dry particle coating apparatus. The coating with a first pitch may be performed at a temperature of 120° C. or more and 150° C. In the above temperature range, impurities included in the first pitch may be easily removed. When it is out of the above temperature range, the charging/discharging performance of a secondary battery may be adversely affected. In an embodiment of the present disclosure, the coating with a first pitch may be performed at a temperature of 120° C. or more and 150° C. at a speed of 2500 rpm for 1 hour.

Furthermore, the content of the first pitch may be 15% or more and 16% or less. When the content of the first pitch is less than 15%, the silicon fine powder, that is, the core, dispersed on the artificial graphite may not be easily coated. Furthermore, an extraction phenomenon that the silicon fine powder is separated from the artificial graphite may occur. Furthermore, the charging/discharging capacity of a secondary battery may be lowered. Reversely, when the content of the first pitch exceeds 16%, the manufacturing cost may be increased too high, and moreover, the thickness of artificial graphite (the thickness of a shell) surrounding the silicon fine powder may be increased. Furthermore, as the particles of the first composite are not uniformly mixed, the life characteristics of a secondary battery may deteriorate, and the energy density of the pole plate of a secondary battery may be lowered.

Figure 3:
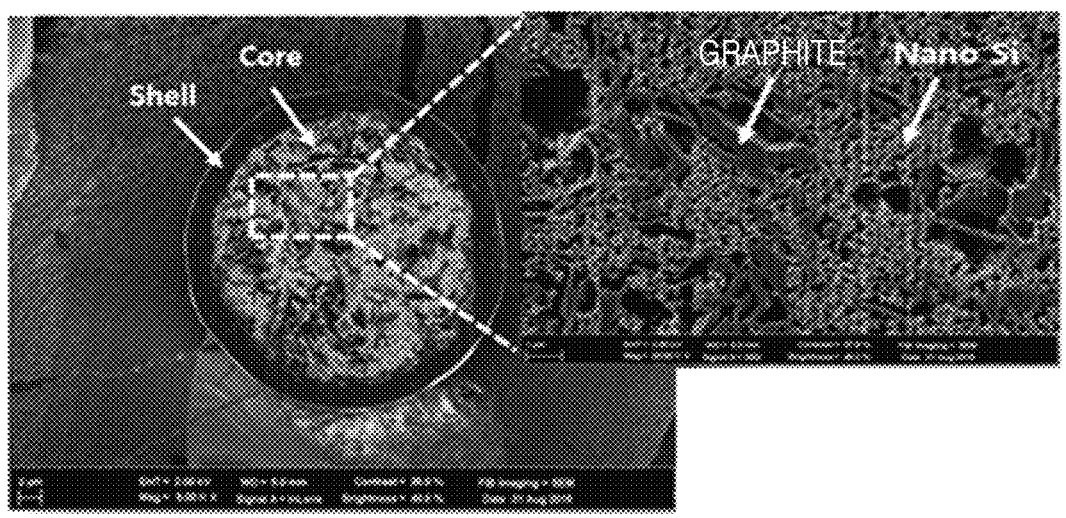
FIG. 3 is an image of a dispersion and a first composite of FIG. 1.

FIG. 3 is an image of the dispersion and the first composite of FIG. 1. Referring to FIG. 3, the dispersion may have a shape in which the first pitch surrounding the core that is formed as the silicon fine powder adheres to the graphite (artificial graphite). In other words, the silicon fine powder and the graphite may constitute the core, and the first pitch may constitute the shell.

Next, the first composite is formed by coating the dispersion with the second pitch (S500). In an embodiment of the present disclosure, the dispersion may be dry-coated with the second pitch, by using the dry particle coating apparatus. The second pitch may be a petroleum pitch that is the same as or different from the first pitch. The second pitch may have mechanical strength that is greater than the first pitch.

Accordingly, a phenomenon that the pole plate is broken in the process of manufacturing the pole plate of a secondary battery may be prevented.

The content of the second pitch may be 16% or more and 17% or less. When the content of the second pitch is less than 16%, the dispersion that is not coated with the second pitch may be present. Accordingly, as the volume change of the silicon fine powder is not smoothly restricted, a secondary battery may be damaged due to the volume change of the silicon fine powder, and the charging/discharging capacity thereof may be reduced. Reversely, when the content of the second pitch exceeds 17%, the manufacturing cost may be increased too high, and moreover, the thickness of the second pitch surrounding the dispersion may be increased too much. Furthermore, the content of amorphous carbon is increased so that the life characteristics of a secondary battery may deteriorate, and the content of the impurities, for example, quinoline, and the like, included in the second pitch may be increased. When the content of impurities is increased, the impurities form crystals so that the characteristics of a secondary battery may be adversely affected.

In an embodiment of the present disclosure, the forming of the first composite may be performed at a temperature of 240° C. or more and 270° C. The viscosity of the second pitch is most excellent in the above temperature range, and thus, the dispersion may be easily coated.

In the first composite, the sum of the content of the first pitch and the content of the second pitch may be 32% or more and 35% or less. When the sum of the content of the first pitch and the content of the second pitch is less than 32%, as the dispersion and the first composite may not be properly coated with the first pitch and the second pitch, respectively, the amount of the first pitch and the second pitch respectively surrounding the dispersion and the first composite is insufficient, and thus, the volume change of the silicon fine powder may not be effectively restricted. Furthermore, as the overall stability of a secondary battery deteriorates, the capacity and life characteristics of a secondary battery may be adversely affected. Reversely, when the sum of the content of the first pitch and the content of the second pitch exceeds 35%, the manufacturing cost is increased too high, and thus, the energy density of a secondary battery may be lowered.

The shape of the first composite formed as above is illustrated in FIG. 3. Referring to FIG. 3, the first composite may generally have a spherical shape as the second pitch coats a multiple of dispersions from the outside.

Next, the second composite is formed by carbonizing the first composite (S600). The first composite including the silicon fine powder, the artificial graphite, the first pitch, and the second pitch undergoes a heat treatment at a high temperature to increase a bonding force therebetween, thereby firmly maintaining the structure of a silicon composite.

A heat treatment furnace used for a carbonization process is not particularly limited, and in an embodiment of the present disclosure, a completely sealed tube furnace may be used. A heat treatment temperature may be in a range of 800° C. or more and 1000° C. or less. When the heat treatment temperature is less than 800° C., volatile ingredients of the first pitch and the second pitch, which are amorphous carbons, are not sufficiently removed, and thus, it may be difficult to improve the initial efficiency of a secondary battery. Reversely, when the heat treatment temperature exceeds 1200° C., silicon crystals grow to react with lithium ions, and thus, the silicon fine powder may expand. Accordingly, cracks may be generated in the pole plate, and thus, the performance of a secondary battery may be adversely affected.

In an embodiment of the present disclosure, the carbonization process may be performed once to three times at a temperature of 800° C. to 1200° C.

Next, the second composite may be classified according to a preset particle size reference (S700). The characteristics affecting the performance of a secondary battery may include the discharging capacity, life efficiency, and expansion rate of a secondary battery, the capacity density of a pole plate, and the like, and the capacity density of a pole plate may be determined by the particle size distribution of a silicon composite. To increase the capacity density of a pole plate, the second composite included in the silicon composite may have various particle size distributions rather than similar particle size distributions. However, when the pole plate density is excessively high, the impregnation of an electrolyte is not easy, and thus, the efficiency and capacity characteristics of a secondary battery may be deteriorated. Accordingly, it is important to appropriately control the particle size distribution of a silicon composite. in an embodiment of the present disclosure, as the second composite is classified by using a classification apparatus, 50% (D50) of the particle size distribution of the second composite may be controlled to be 10 μm or more and 20 μm or less. More particularly, the particle size reference may be set to be within 15 μm to control D50 of the particle size distribution of the second composite. A secondary battery may be prepared by using a classified second composite as the silicon composite. As such, a silicon composite in which the capacity density of a pole plate and the impregnability of an electrolyte are compatible may be prepared by controlling the particle size distribution of a silicon composite.

Figure 2:
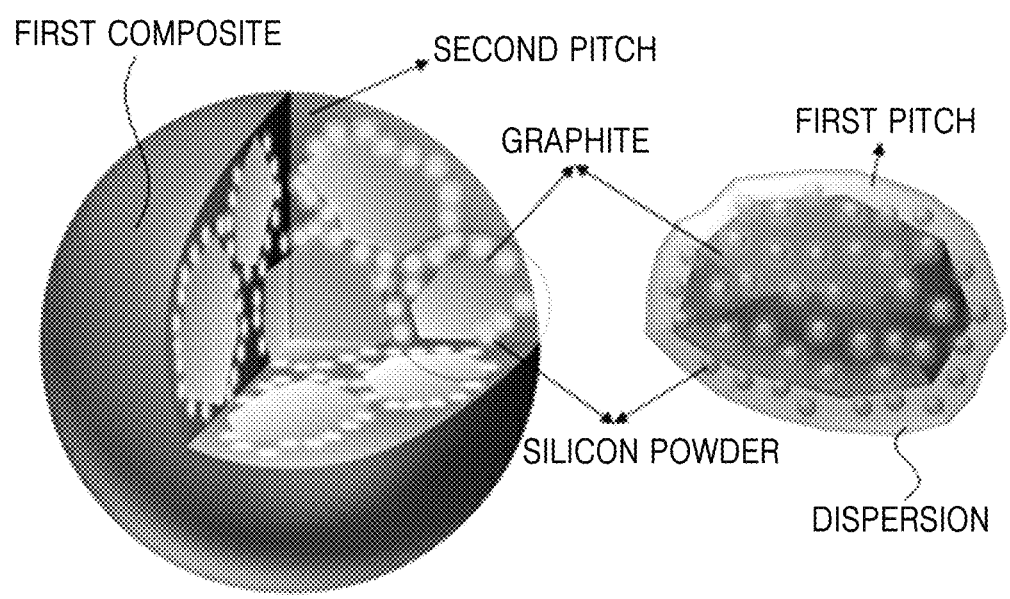
FIG. 2 is an SEM image of a second composite of FIG. 1.

FIG. 2 is a scanning electron microscope (SEM) image of the second composite of FIG. 1. An image at the left of FIG. 2 shows the first composite, and an image at the right of FIG. 2 shows the dispersion.

As illustrated in FIG. 2, in the silicon composite according to an embodiment of the present disclosure, a core is formed as the silicon fine powder is uniformly dispersed around the artificial graphite, and a dispersion is formed as the first pitch coats the core. Furthermore, the silicon composite is formed by coating a plurality of dispersions with the second pitch. At this time, a core of the dispersion including the silicon fine powder and the artificial graphite and coated with the first pitch may be set to a first core, and a plurality of dispersions coated with the second pitch may be set to a second core. Furthermore, the first pitch may be set to a first shell, and the second pitch may be set to a second shell. In other words, the silicon composite according to an embodiment of the present disclosure may have a dual core-shell structure.

Figure 5:
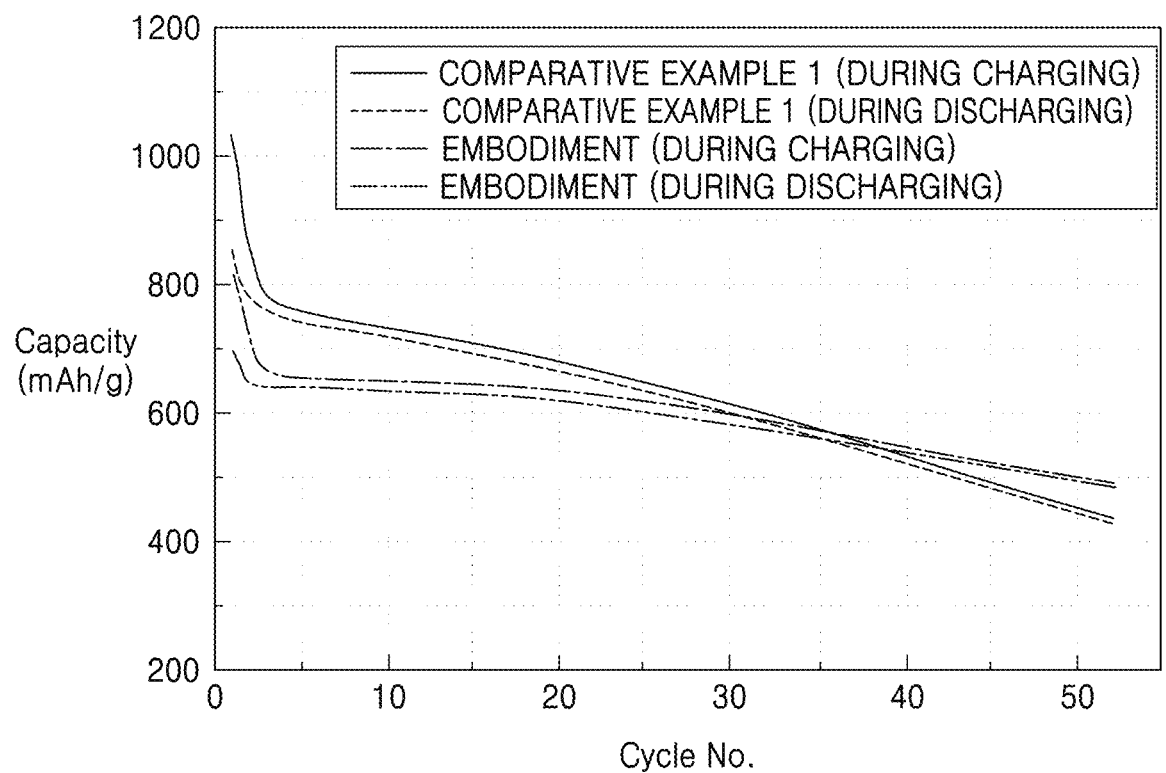
FIG. 5 is a comparison view of the capacity characteristics of secondary batteries according to an embodiment and Comparative Example 1.
Figure 6:
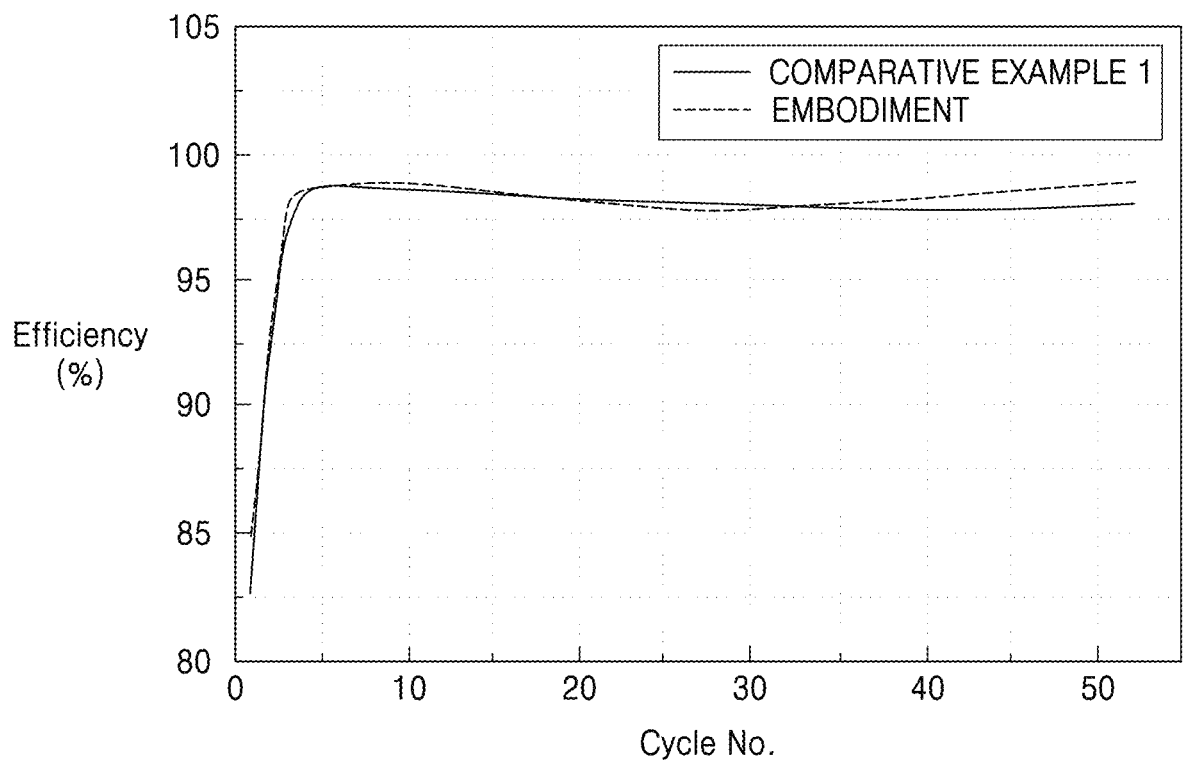
FIG. 6 is a comparison view of the efficiency characteristics of secondary batteries according to an embodiment and Comparative Example 1.

FIG. 5 is a comparison view of the capacity characteristics of secondary batteries according to an embodiment and Comparative Example 1. FIG. 6 is a comparison view of the efficiency characteristics of secondary batteries according to an embodiment and Comparative Example 1.

The embodiment is a secondary battery manufactured by using the silicon composite according to an embodiment of the present disclosure. Comparative Example 1 is a secondary battery manufactured of a deposition-type silicon composite, and the deposition-type silicon composite is a silicon composite manufactured by a method of depositing a silicon oxide on a core by using a plasma deposition apparatus. The deposition-type silicon composite requires a remarkably high manufacturing cost, compared with the dry-coating method using the pitch used in an embodiment of the present disclosure, and thus, economic efficiency and productivity are low.

As illustrated in FIG. 5, it may be seen that, compared with Comparative Example 1, the embodiment has slightly low initial capacity, but the reduction in capacity according to an increase in the number of cycle repetitions is gradual. As the number of cycle repetition exceeds 30 times, it may be seen that the embodiment exhibits relatively high capacity characteristics, compared with Comparative Example 1.

Furthermore, as illustrated in FIG. 6, it may be seen that the embodiment exhibits high initial efficiency, compared with Comparative Example 1, and efficiency characteristics equivalent to Comparative Example 1. In particular, from a time point when the number of cycle repetitions exceeds 32 times, it may be seen that the embodiment exhibits relatively high efficiency characteristics, compared with the related art.

As such, when a secondary battery is manufactured by using the silicon composite prepared according to an embodiment of the present disclosure, it may be seen that the secondary battery exhibits excellent capacity characteristics and efficiency characteristics, compared with the secondary battery manufactured by using the deposition-type silicon composite that is expensive.

Figure 7:
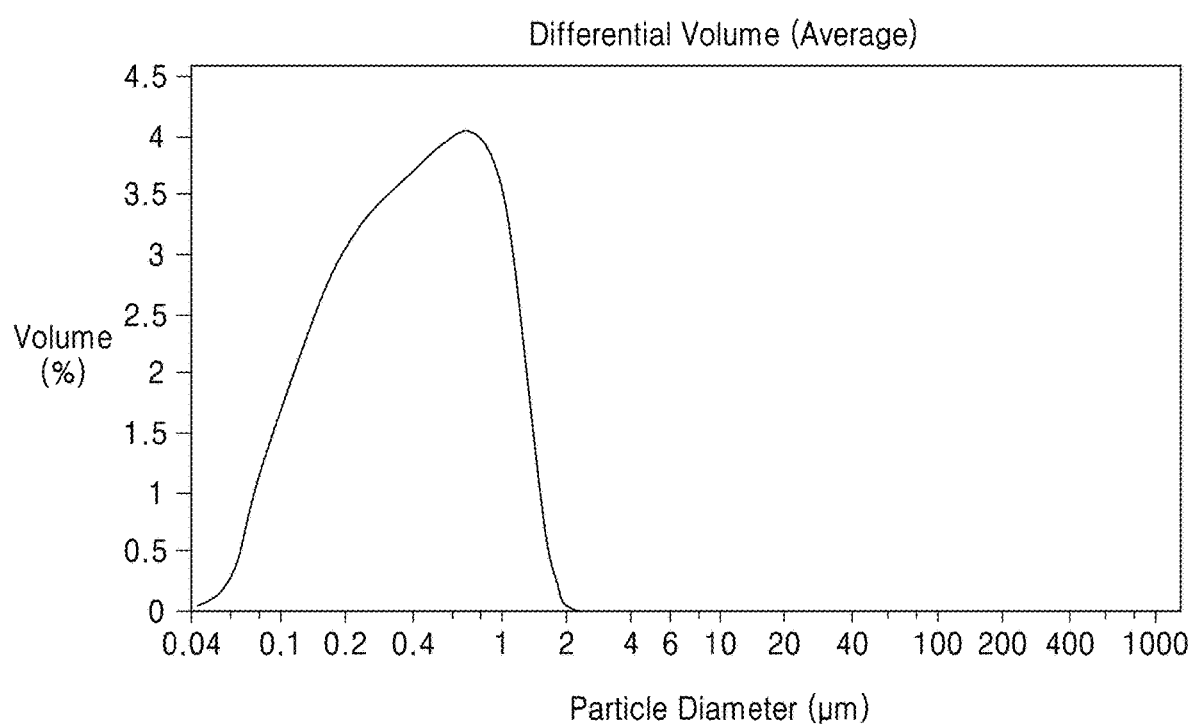
FIG. 7 is a view of a particle size distribution of a silicon composite according to the related art.
Figure 8:
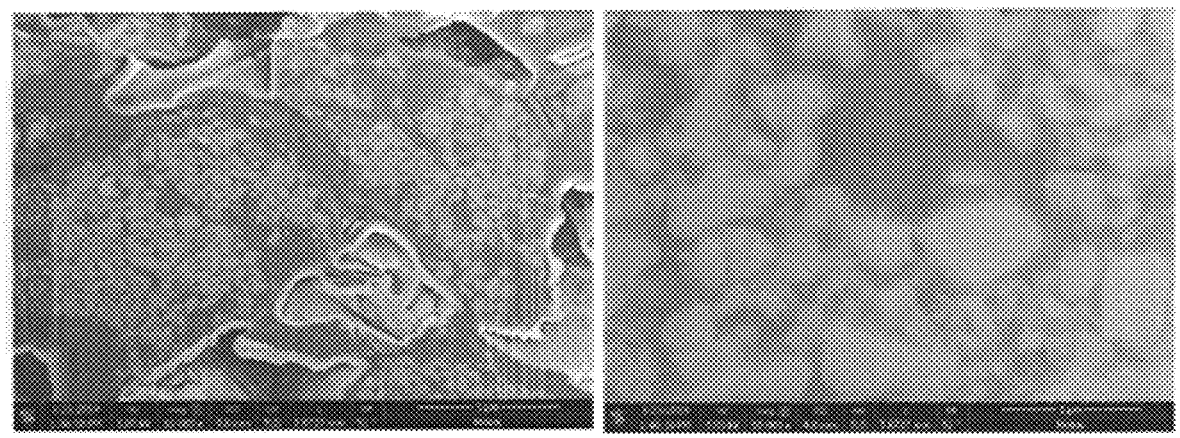
FIG. 8 is an SEM image of the silicon composite according to the related art of FIG. 7.
Figure 9:
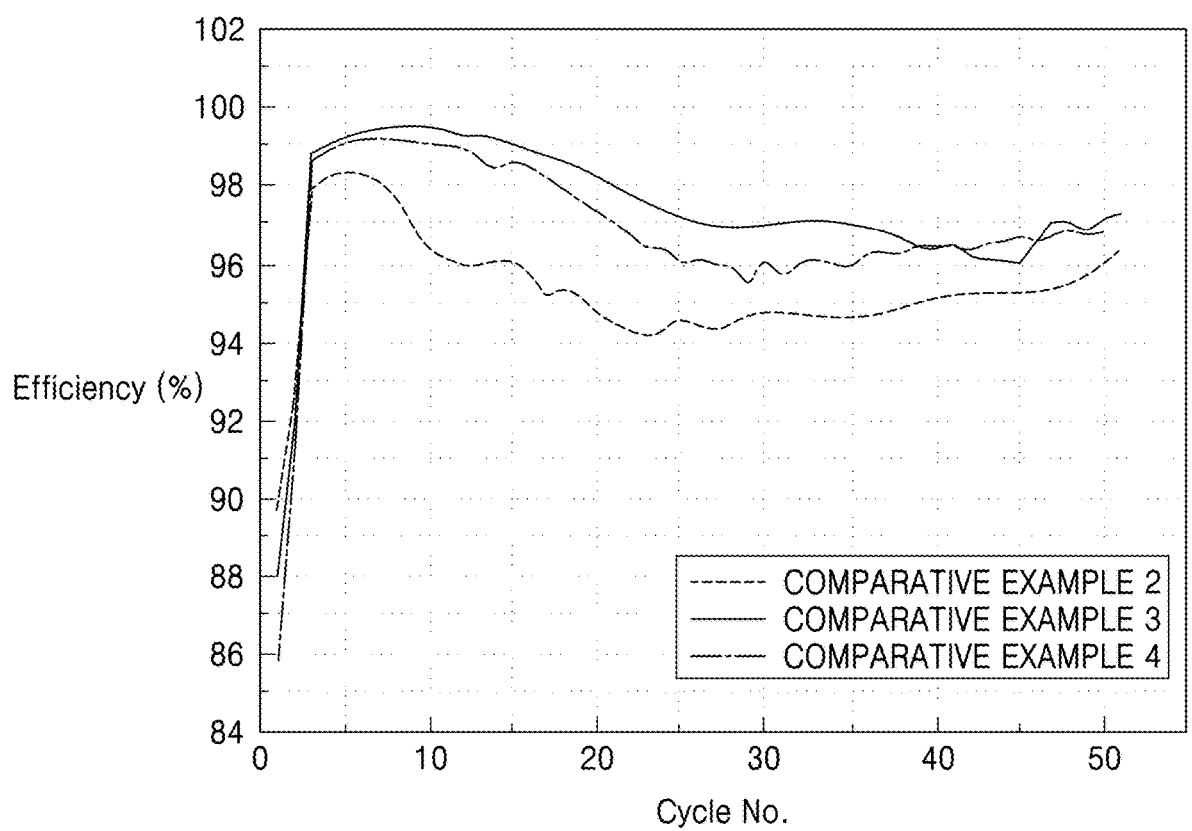
FIG. 9 is a comparison view of the efficiency characteristics of secondary batteries according to Comparative Example 2 to Comparative Example 4.
Figure 10:
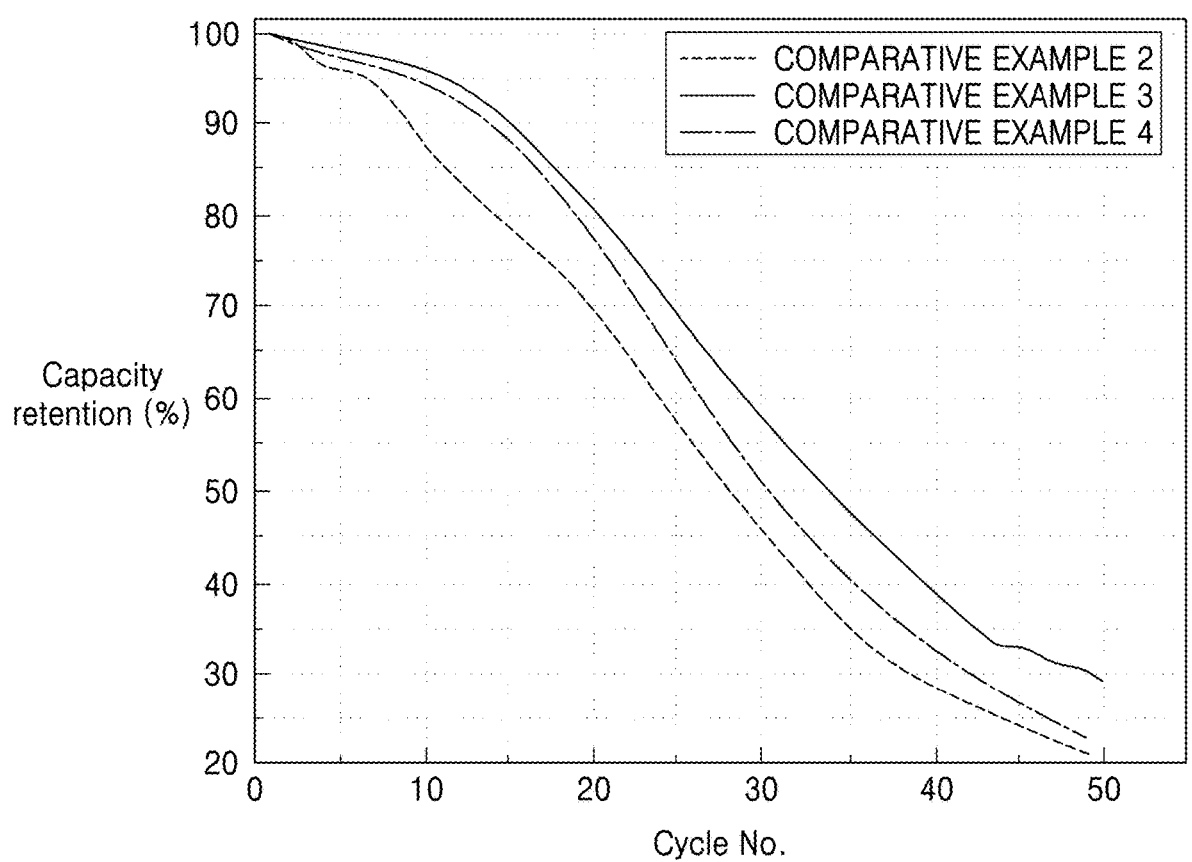
FIG. 10 is a comparison view of the capacity characteristics of secondary batteries according to Comparative Example 2 to Comparative Example 4.

FIG. 7 is a view of a particle size distribution of a silicon composite according to the related art. FIG. 8 is an SEM image of the silicon composite according to the related art of FIG. 7. FIG. 9 is a comparison view of the efficiency characteristics of secondary batteries according to Comparative Example 2 to Comparative Example 4. FIG. 10 is a comparison view of the capacity characteristics of secondary batteries according to Comparative Example 2 to Comparative Example 4.

The silicon composite according to the related art of FIG. 7 is a silicon composite that is out of the particle size of a silicon fine powder distribution range according to the present disclosure. In detail, silicon fine powder of a silicon composite according to the related art has a particle size distribution in which 50% (D50) of the particle size distribution is 0.404 μm, 90% (D90) is 1.056 μm, and 100% (D100) is 2 μm. In other words, in the silicon composite according to the related art of FIG. 7, D90 of the particle size of a silicon fine powder distribution exceeds 1 μm. Referring to FIG. 8, compared with FIG. 3, it may be seen that the particle size of silicon fine powder is much great.

Comparative Example 2 in FIGS. 9 and 10 is a secondary battery manufactured by using the silicon composite according to the related art of FIG. 7. Furthermore, Comparative Example 3 and Comparative Example 4 are secondary batteries manufactured by using a silicon composite according to another related art, which satisfy the particle size of a silicon fine powder distribution according to the present disclosure. However, Comparative Example 3 and Comparative Example 4 do not satisfy all the manufacturing method according to an embodiment of the present disclosure.

Referring to FIGS. 9 and 10, it may be seen that, compared with Comparative Examples 3 and 4, Comparative Example 2 is low in both of the efficiency characteristics and the charging/discharging capacity retention characteristics of a secondary battery. Accordingly, it may be seen that the particle size of a silicon fine powder distribution affects much the characteristics of a secondary battery. In particular, it may be seen that 90% (D90) of the particle size of a silicon fine powder distribution affects much the life characteristics of a secondary battery.

Furthermore, referring to FIGS. 3, 4, 9, and 10, when the entire method of manufacturing a silicon composite according to the present disclosure is satisfied, compared with the secondary battery manufactured by using the silicon composite according to the related art, a secondary battery with improved performance characteristics may be provided.

In another embodiment, at least any one of the disintegrating of the silicon fine powder (S300), the forming of the dispersion (S400), the forming of the first composite (S500), or the forming of the second composite (S600) may be performed in an inert gas atmosphere. The inert gas is not particularly limited, and may be an argon or nitrogen gas.

For example, in the disintegrating of the silicon fine powder (S300), after putting the silicon fine powder in the ultra-fine powder crusher, the silicon fine powder may be disintegrated in the inert gas atmosphere by using an argon and/or nitrogen gas. Furthermore, in the forming of the dispersion (S400), in the process of coating the core with the first pitch, the coating may be performed in the inert gas atmosphere by introducing an argon and/or nitrogen gas. Likewise, in the forming of the first composite (S500), in the coating of the dispersion with the second pitch, the coating may be performed in the inert gas atmosphere by introducing an argon and/or nitrogen gas. Furthermore, in the forming of the second composite (S600), a heat treatment may be performed in the inert gas atmosphere of an argon and/or nitrogen gas. By performing the above operations in the inert gas atmosphere, the target characteristics of a silicon composite in the present disclosure may be stably achieved. Furthermore, the characteristics of a secondary battery manufactured of the silicon composite according to the present disclosure may be stably achieved.

The method of preparing a silicon composite and the silicon composite prepared according to an embodiment of the present disclosure may include the silicon fine powder, the artificial graphite, the first pitch, and the second pitch. The silicon fine powder may be dispersed on the artificial graphite to form the core (first core). Furthermore, the core is coated with the first pitch (first shell) to form the dispersion. Furthermore, a plurality of dispersions (second cores) are coated with the second pitch (second shell) to form the silicon composite. In other words, the silicon composite according to the present disclosure may have a dual core-shell structure.

The content ratio of the silicon fine powder and the artificial graphite may be 26:29 to 35:23. Furthermore, the content of the second pitch may be 16% or more and 17% or less, and the sum of the contents of the first pitch and the second pitch may be 32% or more and 35% or less. Furthermore, the particle size of a silicon fine powder distribution may be 100 nm or more and 400 nm or less, and in detail, 10% (D10) of the particle size distribution may be 0.072 μm, 50% (D50) of the particle size distribution may be 0.136 μm, 90% (D90) of the particle size distribution may be 0.261 μm, and 100% (D100) of the particle size distribution may be 0.452 μm.

The silicon composite according to an embodiment of the present disclosure may be used as a negative active material of a lithium secondary battery. By using the silicon composite according to the present disclosure, a secondary battery with improved performance characteristics including stability, capacity, efficiency, an expansion rate, and the like may be provided. Furthermore, a secondary battery with remarkably improved life may be provided.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The present disclosure, which provides a method of preparing a silicon composite having improved life and capacity of a battery, by reducing the volume change of a silicon material, can be applied to related industrial fields.

The invention claimed is:

1. A method of preparing a silicon composite, the method comprising:
   forming a silicon solution by wet-grinding a silicon raw material;
   forming silicon fine powder by spray-drying the silicon solution;
   disintegrating the silicon fine powder;
   forming a dispersion by coating the silicon fine powder with a first pitch;
   forming a first composite by coating the dispersion with a second pitch;
   forming a second composite by carbonizing the first composite; and
   classifying the second composite according to a preset particle size reference, and
   wherein the forming of the dispersion comprises:
   forming a core by dispersing the silicon fine powder in graphite; and
   dry-coating the core with the first pitch,
   wherein, in the dry-coating of the core with the first pitch, the core is dry-coated with the first pitch at a temperature of 120° C. or more and 150° C., and a content of the first pitch in the dispersion is 15% or more and 16% or less in weight percent.

2. The method of claim 1, wherein,
   in the forming of the silicon solution,
   balls and a solvent are added to the silicon raw material and wet-ground, and a ratio of the silicon raw material and the solvent is 1:4 to 1:6 in weight percentage, and wet-grinding is performed at a grinding speed of 1900 rpm to 3200 rpm for 1.5 hours to 8.5 hours.

3. The method of claim 2, wherein, in the forming of the silicon solution, the wet-grinding is performed at a grinding speed of 1900 rpm to 2100 rpm for 1.5 hours to 4.5 hours.

4. The method of claim 1, wherein, in the forming of the silicon fine powder, the silicon fine powder including particles having a spherical shape is obtained by spraying the silicon solution and then applying hot wind, and the particle size of the silicon fine powder is 100 nm to 400 nm.

5. The method of claim 1, wherein, in the forming of the core, a content ratio of the silicon fine powder and the graphite is 26:29 to 35:23 in weight percent.

6. The method of claim 1, wherein, in the forming of the first composite, mechanical strength of the second pitch is greater than mechanical strength of the first pitch.

7. The method of claim 1, wherein, in the forming of the first composite, a sum of a content of the first pitch and a content of the second pitch is 32% or more and 35% or less in weight percent.

8. The method of claim 1, wherein, in the forming of the second composite, the first composite undergoes a heat treatment at a temperature of 800° C. to 1200° C. for 1 hour to 3 hours.

9. The method of claim 1, wherein at least any one of the disintegrating of the silicon fine powder, the forming of the dispersion, the forming of the first composite, or the forming of the second composite is performed in an inert gas atmosphere.

10. A method of preparing a silicon composite, the method comprising:
   forming a silicon solution by wet-grinding a silicon raw material;
   forming silicon fine powder by spray-drying the silicon solution;
   disintegrating the silicon fine powder;
   forming a dispersion by coating the silicon fine powder with a first pitch;
   forming a first composite by coating the dispersion with a second pitch;
   forming a second composite by carbonizing the first composite; and
   classifying the second composite according to a preset particle size reference,
   wherein, in the forming of the first composite, the dispersion is dry-coated with the second pitch at a temperature of 240° C. or more and 270° C., and a content of the second pitch in the first composite is 16% or more and 17% or less in weight percent.

* * * * *